United States Patent [19]

Kobetsky

[11] 4,163,884

[45] Aug. 7, 1979

[54] INDUCTION HEATING CORE FOR ADHESIVE FASTENING SYSTEMS

[75] Inventor: Robert G. Kobetsky, Chicago, Ill.

[73] Assignee: Illinois Tool Works Inc., Chicago, Ill.

[21] Appl. No.: 837,064

[22] Filed: Sep. 28, 1977

[51] Int. Cl.² ............................................. H05B 5/08
[52] U.S. Cl. .............................. 219/10.49 R; 156/380;
 219/10.53; 219/10.79
[58] Field of Search ............... 219/10.49, 10.53, 10.79,
 219/9.5, 10.57, 10.73, 10.43, 10.61; 156/273,
 380; 336/55, 59, 60

[56] References Cited

U.S. PATENT DOCUMENTS

| | | | |
|---|---|---|---|
| 2,535,836 | 12/1950 | Cameron et al. | 219/9.5 |
| 3,188,440 | 6/1965 | Wokas | 219/10.79 |
| 3,641,281 | 2/1972 | Vauadi et al. | 179/100.2 C |
| 3,754,109 | 8/1973 | Moulin et al. | 219/9.5 |
| 3,836,744 | 9/1974 | Taketo et al. | 219/10.49 |
| 3,883,712 | 5/1975 | McBriarty | 219/10.53 |

Primary Examiner—Bruce A. Reynolds
Attorney, Agent, or Firm—Thomas W. Buckman; Robert W. Beart

[57] ABSTRACT

A U-shaped core for association with a discrete ferromagnetic adhesive carrying article wherein heat is generated in the article through the completion of a flux circuit between the legs of the core and the article. The core and the article abut one another through protuberances of limited area and height to reduce heat loss from the article back into the core.

7 Claims, 5 Drawing Figures

INDUCTION HEATING CORE FOR ADHESIVE FASTENING SYSTEMS

The subject matter of the instant application is related to that of copending application Ser. No. 837,350, filed of even date herewith and common assignee.

This invention relates generally to an induction heating system for use in heat activable adhesive fastening systems.

The invention more particularly relates to an improvement in a U-shaped induction core used to create heat in an adhesive carrying article through the completion of a magnetic flux circuit through the article.

The use of a U-shaped core structure in an induction heating system is a known technique for heating predetermined areas of a ferromagnetic material. Such a technique requires that the end surfaces of the core directly contact the article to be heated to eliminate undesirable flux losses and to also use the core as a pressure applying device when the article to be heated is an adhesive backed element to be secured to a primary work surface.

While such a technique is reasonably successful for many applications, it does inherently permit a certain amount of heat generated in the magnetic article to be conducted back into the core. This back conduction phenomenon increases the total heating time required to activate the adhesive as well as creates undesirable heat level in the core.

Accordingly, it is an object of the invention to provide a U-shaped core structure which prevents conduction of heat from the article being heated back into the core.

Another important object of the invention is to provide an adhesive fastening system which minimizes heat losses from the adhesive carrying article being heated, thus reducing the time cycle to secure an article.

A further important advantage of the invention is to provide a core structure and heating system which reduces the wear on the core when it is used as a pressure applying device.

The above and other objects and advantages of the invention are provided by a U-shaped core including an exciter coil wound about the bridge section of the core and with protuberance means formed between the article to be heated and the end face of the core. The protuberance means are of a limited height and the preferred embodiment describes the protuberances as being rod-like, nonconductive elements embedded in the end faces of the core.

Many other objects, features and advantages of the invention will be more fully realized and understood from the following detailed description when taken in conjunction with the accompanying drawings wherein like reference numerals throughout the various views of the drawings are intended to designate similar elements or components.

DETAILED DESCRIPTION OF THE PREFERRED EMBODIMENT

Figure 1:
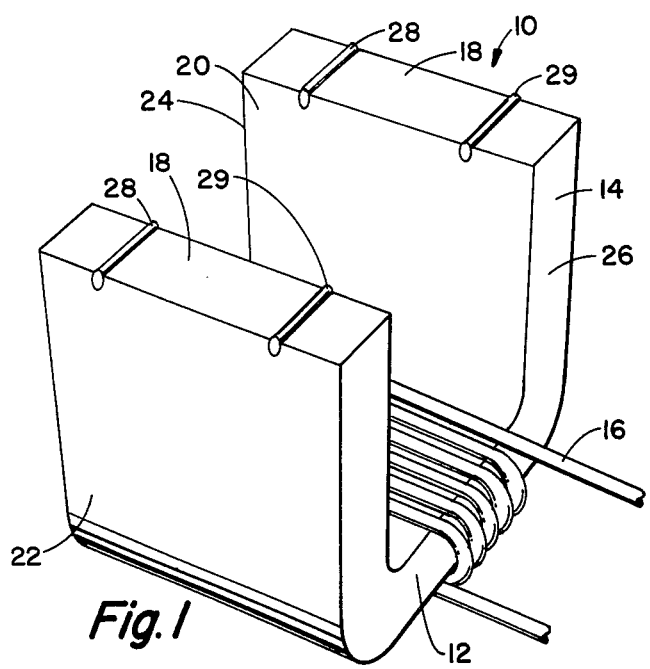
FIG. 1 is a perspective view of the core structure of the present invention.
Figure 2:
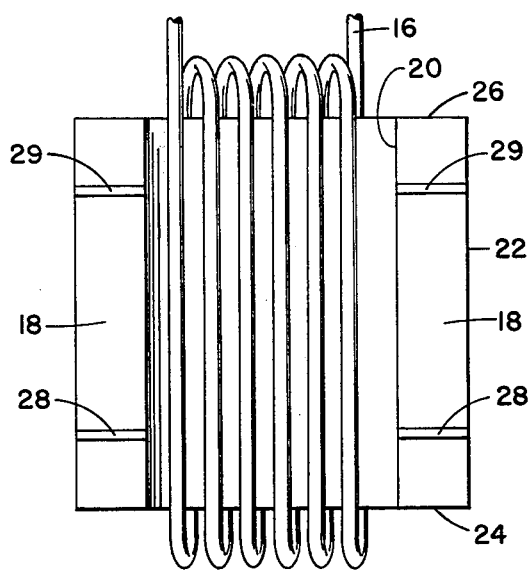
FIG. 2 is a bottom plan view of the core structure of the invention.

Referring now to the drawings, reference numeral 10 denotes the U-shaped core structure which is the subject matter of the invention. The core 10 basically is configured to include a bridge section 12 interconnecting leg regions 14 with an exciter coil 16 wound about the bridge section. As shown clearly in FIGS. 1 and 2, the core structure 10 will also be defined as including substantially flat end faces 18 at the extremities of the legs as well as front and rear surfaces 24 and 26, respectively, and inner leg surfaces and outer leg surfaces 20 and 22, respectively.

Figure 3:
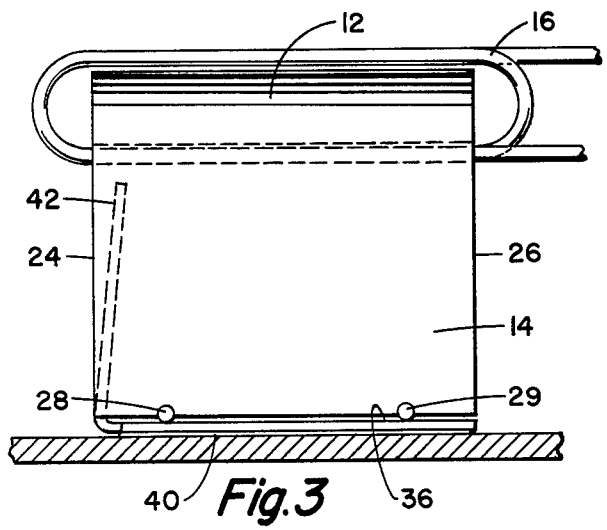
FIG. 3 is a side elevational view of the core structure of the invention shown in association with a workpiece.
Figure 4:
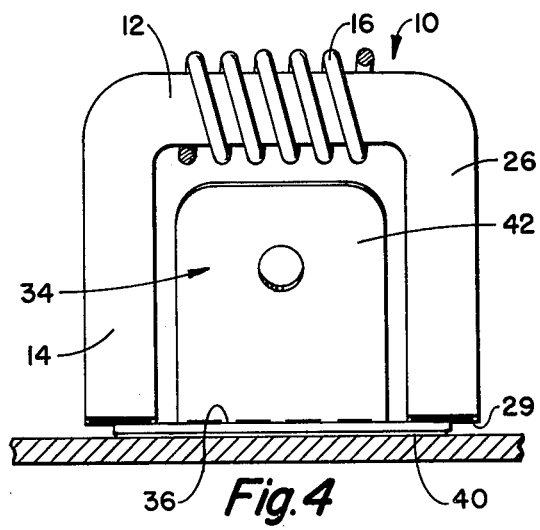
FIG. 4 is a front end view of the fastening system shown in FIG. 3.
Figure 5:
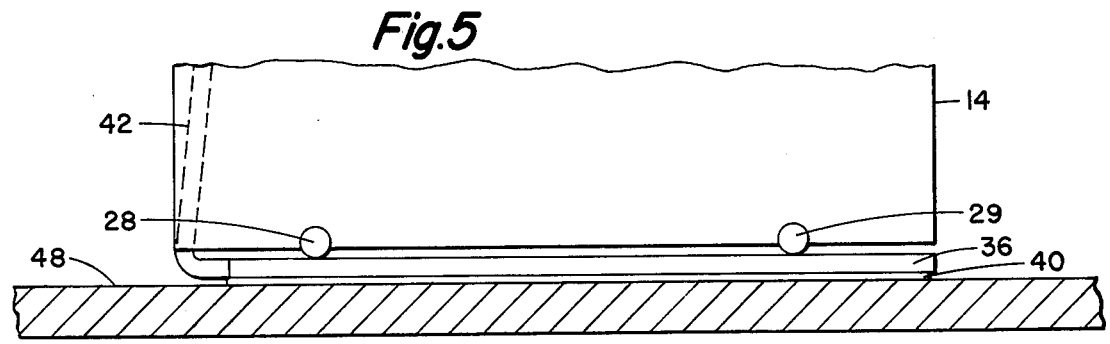
FIG. 5 is an enlarged partial side elevational view showing the relationship of the end faces of the core with the workpiece being heated.

FIGS. 3-5 describe the core 10 in association with an article to be heated. It will be shown that the invention is particularly effective in heating a discrete, ferromagnetic article 34 which will include a flat base 36 carrying a layer of heat activable adhesive 40 therebeneath. The article may typically include a secondary fastening region, such as tab-like extension 42.

Heating systems of this general type rely upon a flux density created in a metal article to produce heat therein by eddy currents and hysteresis when the metal article completes a magnetic flux circuit between the legs of the core. The core is preferably configured to have a relatively large cross-sectional area compared to the article to be heated and the metal article will be of a high loss material with the core itself being of a relatively low loss material. These situations maximize the heat created in the article by the hysteresis and eddy current effect, thus producing a heat level in a metal article high enough to activate the adhesive. In many industrial applications, it is very important that the time required to effect such a fastening be minimized so the heating process should be as efficient as possible.

As noted above, prior art heating systems tend to permit the heat generated in the ferromagnetic article to be conducted back into the core. It is with this condition in mind that reference is now made to spacer elements 28 and 29 formed in the end surfaces of the core. In the preferred embodiment, these spacer elements are rod-like, nonconductive elements extending in a direction from the inner surfaces 20 of the leg toward the associated outer surfaces 22. These spacer elements are embedded in the end surfaces of the laminated core and are suitably fixed therein, for example by adhesive. Elements 28 and 29 will protrude from the end surfaces 18 a carefully and accurately controlled short distance. The distance of protrusion should be uniform throughout the length of each element. The distance that end surfaces 18 are spaced from the metal article should not be so great as to permit a significant flux loss to occur. Preferably this distance will be in the range of 0.002 in.–0.005 in. but the exact dimensioning will, of course, vary with the application and article being heated.

Since the core 10 will typically be used as a pressure applying element in the adhesive fastening system, the nonconductive spacer elements 28 and 29 should also be of a hard, wear-resistant material. It has been found that a ceramic material or aluminum oxide material satisfies the insulating as well as wear-resistant requirements of this invention.

For stability in the heating system, at least two rod-like elements spaced from one another should be embedded in each end surface and as shown in the drawings.

The invention described above thus provides a core and an adhesive fastening system of particular value in securing a small, discrete, ferromagnetic article to a work surface when a short, accurately controlled temperature level is required to activate an adhesive layer. The invention describes a preferred embodiment for spacingly insulating the end surfaces of a core from the surface being heated without appreciably sacrificing heat losses by flux density loss. The invention further describes the means to reduce wear on the end faces when the core is to be used as a pressure applying element during the heating of the work surface.

While the invention has been described with particular reference to a preferred embodiment, it will be understood that it is not intended to limit the invention to that embodiment. On the contrary, it is intended to cover all alternatives, modifications and equivalents as may be included within the spirit and scope of the invention as described by the appended claims.

I claim:

1. An adhesive fastening system comprising, in combination, a pressure applicating U-shaped core means having inductor windings wrapped around a region thereof, a discrete, ferromagnetic article having a plate-like portion with an upper and lower surface carrying a layer of heat activable adhesive on said bottom surface adapted to be adhesively secured to a support surface, the discrete article completing a magnetic circuit between the legs of the U-shaped core, the end faces of the legs of the core and laterally spaced predetermined side marginal regions of said upper surface of the article configured to form pairs of opposing substantially flat surfaces creating the juncture regions between the core and article facilitating the formation of a closed magnetic flux path, rod-like members of rigid, electrically insulating, force transmitting material, embedded in each of the end faces of the core transversing the end faces in a direction from an inner leg surface to an outer leg surface, at least two spaced rod-like members being embedded in one end face to stabilize the core when compressingly associated with the article, the rod-like members serving to maintain said opposing surfaces in carefully controlled, slightly spaced relationship to each other and prevent heat generated in the discrete article from being conducted back into the core while therefore permitting the magnetic flux generated in said article to generate heat sufficient to activate the adhesive for securement to the support surface.

2. The system of claim 1, wherein the rod-like members protrude beyond the end surfaces a uniform amount throughout the length of said members.

3. The system of claim 1, including at least two spaced elements in each end surface, all elements protruding an equal amount from said end surfaces.

4. The system of claim 1, wherein the elements protrude an amount in the range of 0.002 in.–0.005 in.

5. The system of claim 1, wherein the elements are of a ceramic material.

6. The system of claim 1, wherein the elements are of an aluminum oxide material.

7. The adhesive fastening system of claim 1, wherein the discrete ferromagnetic article includes a nonadhesive carrying secondary attachment means integrally connected to the upper surface region of the article.

* * * * *